(12) United States Patent
Huang et al.

(10) Patent No.: US 7,269,138 B2
(45) Date of Patent: Sep. 11, 2007

(54) DISTRIBUTED MAC PROTOCOL FACILITATING COLLABORATIVE RANGING IN COMMUNICATIONS NETWORKS

(75) Inventors: Jian Huang, Coral Springs, FL (US); Feng Niu, Weston, FL (US); Yan Huang, Weston, FL (US); Spyros Kyperountas, Boca Raton, FL (US)

(73) Assignee: Motorola, Inc., Schaumburg, IL (US)

( * ) Notice: Subject to any disclaimer, the term of this patent is extended or adjusted under 35 U.S.C. 154(b) by 1020 days.

(21) Appl. No.: 10/454,192

(22) Filed: Jun. 4, 2003

(65) Prior Publication Data

US 2004/0246903 A1    Dec. 9, 2004

(51) Int. Cl.
*G01R 31/08* (2006.01)
(52) U.S. Cl. .................................. 370/231; 370/237
(58) Field of Classification Search ............... 370/913, 370/329, 231, 237
See application file for complete search history.

(56) References Cited

U.S. PATENT DOCUMENTS 6,453,168 B1 *   9/2002   McCrady et al. .......... 455/517
6,768,730 B1 *   7/2004   Whitehill .................. 370/348

OTHER PUBLICATIONS

McCrady, D. D. et al.: "Mobile Ranging Using Low-Accuracy Clocks", IEEE Transactions on Microwave Theory and Techniques, vol. 48, No. 6, Jun. 2000, pp. 951-957.

* cited by examiner

*Primary Examiner*—Seema S. Rao
*Assistant Examiner*—Wanda Z Russell

(57) ABSTRACT

A method for reducing communications in a peer-to-peer wireless network having nodes includes sending an RTS-TOA ranging communication from a first node ($N_0$) in a node group to another node (Nr, I) in the group, receiving the RTS-TOA communication with the second node (Nr, I) and sending a multi-cast CTS-TOA/RTS-TOA ranging communication from the second node (Nr, I) as a reply to the received RTS-TOA communication, and successively and sequentially repeating the multi-cast sending step for each of the nodes. A CTS-TOA message is a reply to the received RTS-TOA message and, simultaneously, is an RTS-TOA ranging communication to a new destination node (J). The method applies for a randomized communications approach when node identifications are not sequenced and to a sequential approach where nodes are sequenced, and also applies to completely connected and multi-hop networks. Also provided is a node for carrying out the method of the present invention.

40 Claims, 7 Drawing Sheets

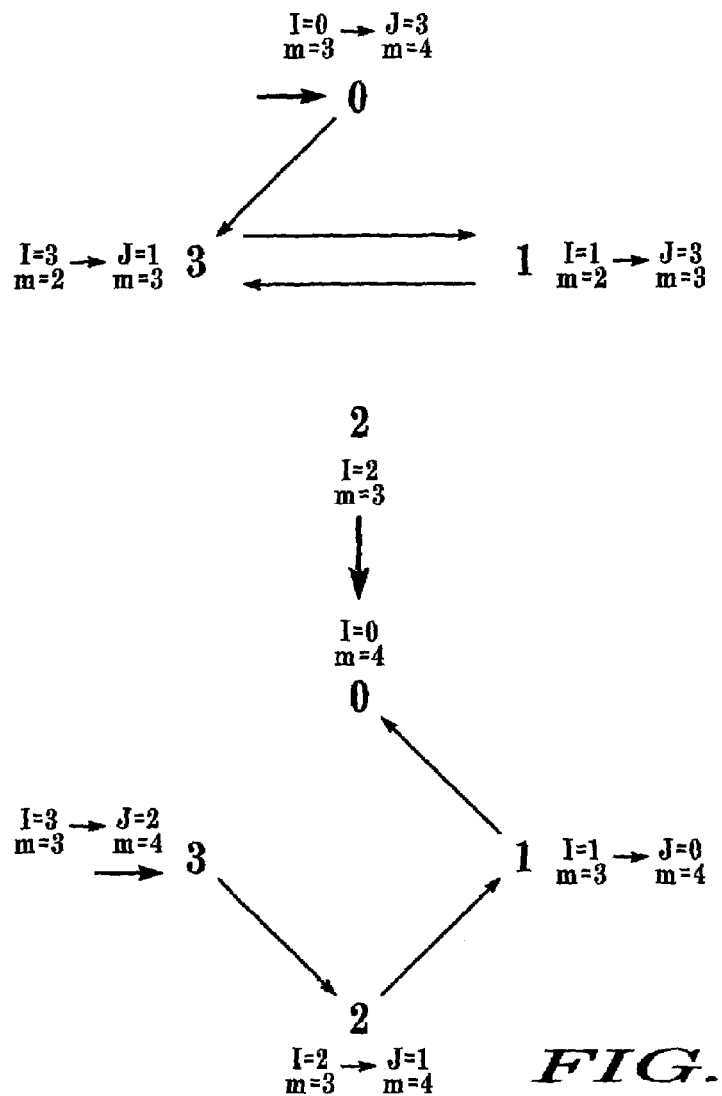
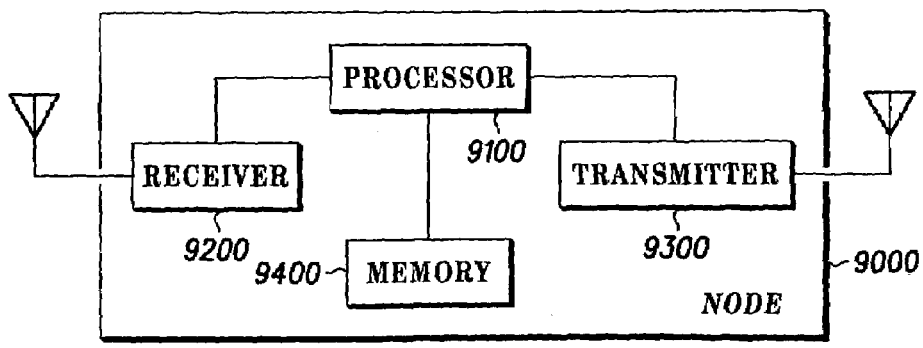
FIG. 8
FIG. 9

DISTRIBUTED MAC PROTOCOL FACILITATING COLLABORATIVE RANGING IN COMMUNICATIONS NETWORKS

BACKGROUND OF THE INVENTION

1. Field of the Invention

The invention lies in the field of electronic communications. The invention relates to a distributed MAC protocol facilitating collaborative ranging in communications networks.

2. Description of the Related Art

Precision location based on peer-to-peer ranging is a desirable attribute in various communications networks. Traditionally, round-trip time based range measurement is accomplished with a pair-wise MAC procedure (in other words, for one device to communicate with another device, the nodes have to perform a handshake process). To resolve the round-trip time, what is currently required is a round trip communication using unicast communications through a modified Request-to-Send/Clear-to-Send (RTS/CTS) to obtain time stamps from a remote node. However, a large number of rounds of communications is associated with such a procedure when applied to a network-wide ranging. This substantial communication overhead is axiomatic when considering a large and densely deployed network.

SUMMARY OF THE INVENTION

The invention provides a distributed MAC protocol facilitating collaborative ranging in communications networks that overcomes the hereinafore-mentioned disadvantages of the heretofore-known devices and methods of this general type and that provides a novel MAC protocol utilizing multi-cast communication with demonstrated superiority in terms of number of communications as compared to the prior art.

A method for reducing communications in a peer-to-peer wireless network having nodes according to the present invention sends an RTS-TOA ranging communication from a first node in a group of the nodes to a second different node in the group, receives the RTS-TOA ranging communication with the second node and sends a multi-cast CTS-TOA/RTS-TOA ranging communication from the second node as a reply to the received RTS-TOA ranging communication, and successively and sequentially repeating the multi-cast sending step for each of the group of nodes. A CTS-TOA message is a reply to the received RTS-TOA message and, simultaneously, is an RTS-TOA ranging communication to a new destination node. The method applies for a randomized communications approach when node identifications are not sequenced and to a sequential approach where nodes are sequenced, and also applies to completely connected and multi-hop networks.

In a randomized approach, a source node randomly selects a receiving node that will next receive the RTS-TOA portion of the multi-cast communication and each successive receiving node individually determines if it has already sent a communication to all neighboring nodes (which includes all nodes in a completely connected network). If it has, then, a unicast CTS-TOA communication is sent to the source node and, the source node selects another random destination node so long as it has other neighbors to which it can send the next multi-cast communication. If there are no destination nodes available, then, the source node terminates transmission and broadcasts a full message to at least one other node in the group. At such a point in time, each node still having transmissions to make repeats the multi-cast communication, in parallel. The repetition is carried out until all of the nodes in the group have finished all round-trip-time calculations for all other nodes in the group. When all nodes of the group have completed all communications, then round-trip-time calculations are collected and unknown locations of nodes in the group are resolved.

In a sequential approach, each node has a unique identification, and the identifications are ordered in a single list that is stored in a memory of each of the nodes. The selection of the receiving node to next receive the RTS-TOA portion of the multi-cast communication takes place deterministically according to the formula: $J=\mod(I+m, X)$, where I is the identification of a current node to be initiating the next communication and the initialization node is the first current node, J is the identification of a next node to receive the next communication, m is an integer flag of the current round of round-trip-time measurement for the current node with identification I, and X is the total number of nodes in the group. Each successive receiving node individually determines if its the integer flag is equal to X and, if so, then the process can be terminated because all nodes have been address. Thus, ranging data can be calculated for all nodes in the group.

In either approach, the group can be defined as the entire network, and the network can be a completely connected network or a multi-hop peer-to-peer network.

The network can be made of a plurality of communications nodes, each of the nodes having a receiver, a transmitter, a memory, and a processor connected programmed to carry out the processes according to the present invention.

Other features that are considered as characteristic for the invention are set forth in the appended claims.

Although the invention is illustrated and described herein as embodied in a distributed MAC protocol facilitating collaborative ranging in communications networks, it is, nevertheless, not intended to be limited to the details shown because various modifications and structural changes may be made therein without departing from the spirit of the invention and within the scope and range of equivalents of the claims.

BRIEF DESCRIPTION OF THE DRAWINGS

The features of the present invention, which are believed to be novel, are set forth with particularity in the appended claims. The invention, together with further objects and advantages thereof, may best be understood by reference to the following description, taken in conjunction with the accompanying drawings, in the several figures of which like reference numerals identify like elements, and in which:

FIG. 8 is a flow chart illustrating an alternative embodiment of the communications method according to the invention; and FIG. 9 is a block circuit diagram of a node according to the invention.

DESCRIPTION OF THE PREFERRED EMBODIMENTS

Figure 1:
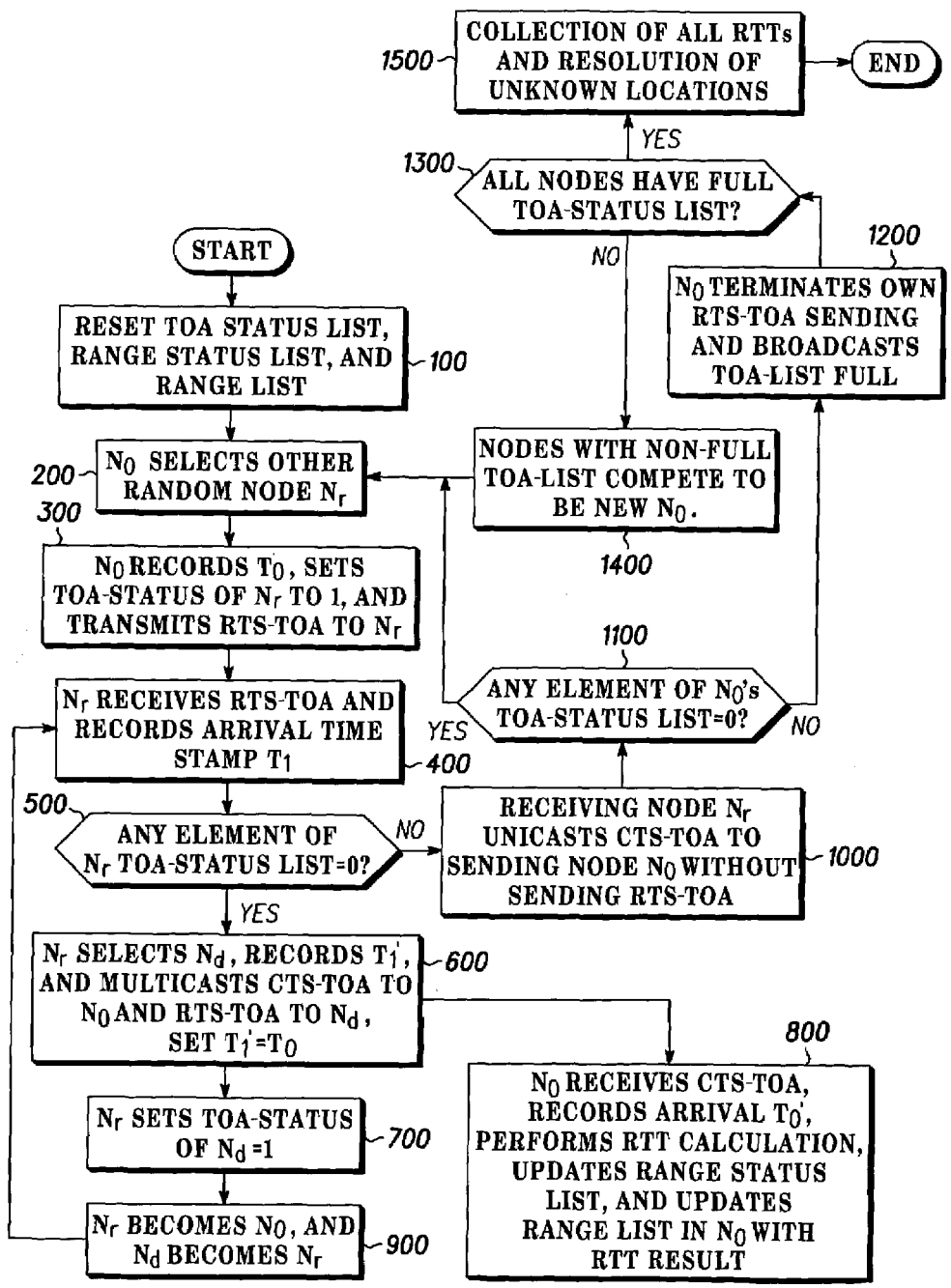
FIG. 1 is a flow chart illustrating a communications method according to the invention.

While the specification concludes with claims defining the features of the invention that are regarded as novel, it is believed that the invention will be better understood from a consideration of the following description in conjunction with the drawing figures, in which like reference numerals are carried forward.

Round-trip-time based ranging can be carried out in some communications networks using MAC protocols. Round-trip-time (RTT) based ranging is fundamentally different from Received Signal-Strength Indication (RSSI) based ranging (which determines ranging based upon the measured power of a received signal) and it is particularly relevant to the ranging techniques that take advantage of ultra-wide band technology. An example hardware platform that can be used to demonstrate RTT based peer-to-peering ranging is XtremeSpectrum's trinity chipset.

To estimate the signal travel time between a pair of nodes, a sequence of operations originating from a sender's MAC layer has to occur and multiple message exchange happens between a sender node and a receiver node. The number of rounds of communications increases if multiple measurements are required. In order to perform an RTT measurement, a node needs to access to a radio channel. Access can be scheduled without competing by being allocated a specific time or frequency with which to send a transmission (contention-free) or through a controlled random access procedure where all devices contend for a channel at the same time (contention based). The MAC layer protocol supporting RTT measurement can be contention based or contention-free based. A contention based RTT measurement requires that a modified Request-to-Send (RTS) and Clear-to-Send (CTS) with timing information be enclosed in the MAC frame. As is known, an RTS alerts the intended destination that the sending device wants to communicate and a CTS verifies that the sending device "has the floor to speak" and makes everyone else silent.

Carrier Sense Medium Access (CSMA) with Collision Avoidance (CA), also referred to as CSMA/CA, is a specific kind of contention based channel access scheme. This basic RTT measurement procedure (communication of an RTS and CTS sequence) uses a variation of RTS/CTS that originally was used to combat the hidden/exposed terminal problem, which problem describes the interference of receiving at a node C due to the simultaneous transmissions from two nodes A and B that are not in range of each other but are each within the range of node C. Simply put, the exposed terminal problem describes the collision due to the simultaneous transmissions of two nodes A and B in range.

A variation of RTS/CTS that serves RTT measurement changes an RTT into a Request-to-Send—Time of Arrival (RTS-TOA). A Clear-to-Send—Time of Arrival (CTS-TOA) represents the acknowledgement of the receiver of an RTS-TOA. The present invention seeks to reduce the ranging time and processing required to locate nodes in the network. To achieve this reduction, the invention of the present application uses the RTS/CTS protocol (because such a procedure requires the shortest network delay due to contention or other uncertainties) and attaches ranging information (TOA) to the RTSs and CTSs.

An example of RTS-TOA/CTS-TOA measurement is, for example, a first node N sending an RTS-TOA to a second different node P, with the second node P replying thereto with a CTS-TOA. Based upon second node P's CTS-TOA response, the first node N is able to calculate the distance between the first node N and the second node P. (See formulas (2) and (3) below.)

In a brute force ranging approach with a consecutive RTT measurement procedure, a first node N sends an RTS-TOA to a second node P. The second node P replies to this RTS-TOA with a CTS-TOA and, then, transmits a new RTS-TOA to a third node Q. Use of the CTS-TOA of the second node P is only made by the first node N, and communication between the second node P and the third node Q is separate from the communication between the first node N and the second node P. Because of such separation, collection of all ranging data for the entire network is time-consuming, involves a prohibitively large number of individual ranging communications, and requires a substantial amount of processing.

The procedure according to the present invention, however, alters this prior art measurement in a novel way. In a first scenario illustrating the method according to the present invention, a consecutive RTT measurement procedure is followed using a brute force ranging approach. In such a procedure, a first node N sends an RTS-TOA to a second node P. The second node P replies to this RTS-TOA with a CTS-TOA and transmits a new RTS-TOA to a third node Q. Significantly, because the second node P is in range of both the first node N and the third node Q, the RTS-TOA from the second node P can be "heard" by both the first node N and the third node Q. Using this knowledge, therefore, the CTS-TOA from the second node P to the first node N is also used to form the new RTS-TOA from the second node P to the third node Q; in other words, the ranging communication of the second node P is a multi-cast formatted transmission of a frame that will be addressed to both the first node N and the third node Q. Applying this process to a global ranging procedure traversing all of the nodes in a network reveals that the total number of rounds of ranging communications is simplified and reduced by approximately 50%. This knowledge forms the basis for the approach of the processes according to the present invention.

Although the exemplary embodiment of the present invention applies to ranging communications, the same techniques can be applied to other applications requiring successive time stamps exchange in network-wide clock synchronization and data synchronization, etc.

In the following sections, two scenarios are considered:
1. a completely connected wireless network where every node is a neighbor of every other node; and
2. a multi-hop network where only peer-to-peer communication is allowed.

The following assumptions are also applicable for each scenario:

a) whenever an RTS-TOA is sent from an originating node to a target node, a CTS-TOA will be received from the target node;
b) every node in the network has memory to hold a Time-of-Arrival-status list, a range-status list, and a range list; and
c) the network contains M reference nodes (defined as nodes having known initial locations) and N unknown nodes (defined as nodes having no initial location information).

A step-by-step procedure is described in the following text for each of these two scenarios.

1. Completely Connected Radio Network

As set forth above, the procedure according to the present invention is applied to a completely connected wireless network where every node is a neighbor of every other node. In a completely connected wireless network, two approaches for locating nodes of the network can be performed, to wit, randomized communications and sequential communications. Each approach will be discussed in turn.

A. Randomized Communication Approach

When node identifications are not sequenced, each node may or may not know the total number of nodes in the network. If each node is aware of a possible maximum number of nodes, a random communication approach is preferred. In the random communication approach, two different types of nodes are defined: one being reference nodes and the other ordinary nodes. The references nodes will not move such that their reference location is meaningful. If each node is aware of a possible maximum number of nodes including M reference nodes with fixed and known locations and N ordinary nodes with locations to be determined (the M+N nodes defining the completely connected network), the total number of links, therefore, can be expressed by the formula:

$$L = \frac{(N+M)(N+M-1)}{2}. \quad (1)$$

In such a case, a traditional, prior art pair-wise range measurement to cover all of the possible ranges requires up to 2 L number of rounds of communications.

To substantially reduce the number of rounds of communications, the invention of the present application modifies this procedure as illustrated in the flow chart of FIG. 1.

To describe the procedure, it is assumed that each node has available a local memory having stored therein all node identifications, a TOA-status list, a range-status list, and a range list.

The TOA-status list in each node has an individual entry for each of the other nodes. Each TOA-status entry indicates, through a flag, if a ranging communication has been initiated from the particular node in which the TOA-status list resides to another one of the nodes in the network. Value "0" of a TOA-status entry means that the corresponding ranging communication has not been initiated yet, and value "1" means that such a ranging communication has been initiated. The initial values of all of the TOA-status entries are 1. Once a ranging communication is triggered, all of the entries will be reset to zeros.

Similarly, the range-status list in each node has an individual range-status entry for each of the other nodes. Each range-status entry indicates the status of the range measurement, "0" meaning that the particular range has not yet been measured and "1" indicating that the particular range has been measured. The initial values of all of the range-status entries are 1. Similar to TOA-status list, once a ranging measurement is triggered, all of the entries will be reset to zeros.

Lastly, the range list in each node has an individual range entry for each of the other nodes. Each range entry has the range value to a corresponding neighbor node whose range from the node itself has been measured. An entry with value "−1", for example, means this entry has an invalid range value (i.e., not measured yet).

Thus, if the completely connected network has N+M nodes, then the dimension of each of the TOA-status list, the range-status list, and the range list will be N+M−1.

The range determination procedure starts from a selected start node, defined herein as special or initialization node $N_0$. Before communication starts, it is assumed that each of the N+M nodes has no TOA-status information, no range-status information, and no range information. Therefore, in Step 100, each entry of the TOA-status list, the range-status list, and the range list in each node of the network is reset (to 0, for example).

Figure 2:
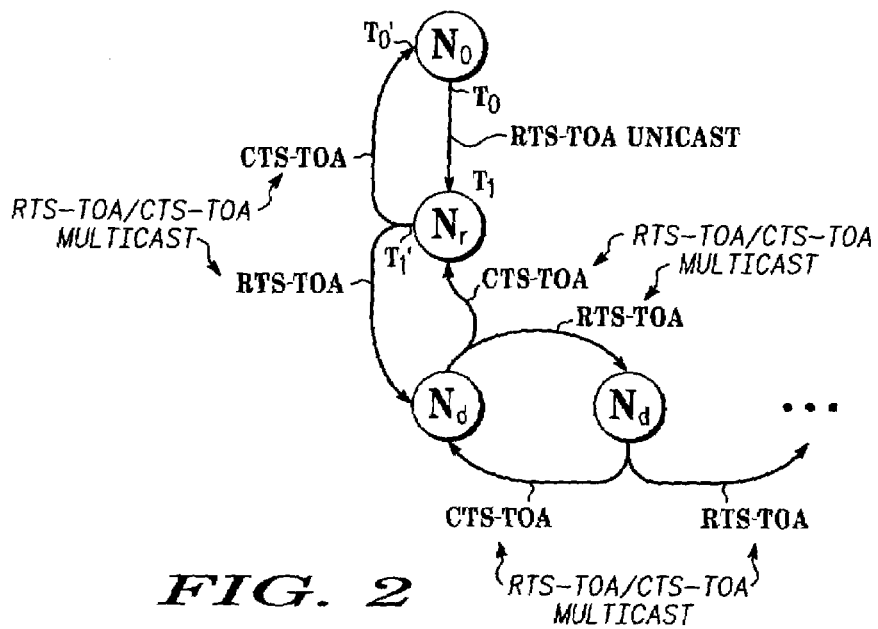
FIG. 2 is a signal flow diagram between nodes in a network applying the method according to the invention.

Then, to start the ranging process in Step 200, special node $N_0$ selects a randomly chosen receiving node $N_r$ other than itself to transmit to receiving node $N_r$ a unicast RTS-TOA message. Special node $N_0$, then, in Step 300, sets the TOA-status of the randomly chosen receiving node $N_r$ to be 1 in its TOA-status list, transmits an RTS-TOA to receiving node $N_r$, and stores special node $N_0$'s current transmission time stamp $T_0$. Setting of this flag from 0 to 1 means that special node $N_0$ has sent an RTS-TOA to receiving node $N_r$ and will not be sending another RTS-TOA to receiving node $N_r$ again. The unicast message is shown in the signal flow diagram of FIG. 2 as the downward-pointing arrow between special node $N_0$ and receiving node $N_r$.

Upon receiving the RTS-TOA, receiving node $N_r$ performs various operations. First, in Step 400, receiving node $N_r$ records a local arrival time stamp $T_1$. Then, in Step 500, receiving node $N_r$ checks if there is any entry of receiving node's $N_r$ TOA-status list that is set to 0. It is noted that this situation is guaranteed to occur if the ranging originates from special node $N_0$ because all TOA-status list entries in each node were just zeroed out in Step 100. So, for this iteration, it is assumed that there exist many (if not all) entries of receiving node's $N_r$ TOA-status list that are set to 0. Alternatively, if the procedure has continued from Step 900 as set forth below (where $N_r$ becomes $N_0$), then the possibility of having all entries in receiving node's $N_r$ TOA-status list being set to 1 does exist. This situation is explained in detail with regard to the text relating to the repetition of Steps 400 to 900.

The presence of an element of receiving node's $N_r$ TOA-status list being 0 means that receiving node $N_r$ still has to transmit further ranging information to other nodes in the network. Therefore, in Step 600, receiving node $N_r$ selects another random destination node $N_d$, records $T_1'$, and sends a multi-cast message addressing both sending node $N_0$ and the newly selected random destination node $N_d$ that is not sending node $N_0$. This multi-cast message is, basically, the CTS-TOA to sending node $N_0$. Significantly, however, this multi-cast message is, simultaneously, also a new RTS-TOA to the randomly selected destination node $N_d$, which is illustrated as the two-headed arrow originating from receiving node $N_r$ on the left side of FIG. 2 and terminating at both sending node $N_0$ and destination node $N_d$. The multi-cast message contains both the current local transmission time stamp $T_1'$ of the CTS-TOA/RTS-TOA for receiving node $N_r$, and the arrival time $T_1$ of the message from sending node $N_r$ (which, in this first case, happens to be special node $N_0$). After sending the RTS-TOA transmission to destination node $N_d$, in Step 700, receiving node $N_r$ sets, in its own TOA-status list, the TOA-status of the destination node $N_d$ to be 1. It is noted that the current local transmission time stamp $T_1'$ for $N_0$-$N_r$ is also the current transmission time stamp $T_0$ for $N_r$-$N_d$. See Step 600.

Upon receiving the CTS-TOA message from receiving node $N_r$, in Step 800, the sending node $N_0$ records the current local arrival time stamp $T_0'$ of the received CTS-TOA message and performs an RTT calculation based on the four time stamps, which specifically include the first transmit time stamp $T_0$, the first arrival time stamp $T_0'$, the second transmit time stamp $T_1'$, and the second arrival time $T_1$. These time stamps are diagrammatically illustrated in FIG. 2 between sending node $N_0$ and receiving node $N_r$. After finishing the RTT calculation, sending node $N_0$ will set a range status flag to 1 for receiving node $N_r$. In other words, the range status table entry in sending node $N_0$ will be set to 1 for receiving node $N_r$. The arrow to the block with reference numeral 800 is dashed to indicate that the events described therein occur on a node that is different from the current node, specifically, they are occurring on the previous node receiving the CTS-TOA portion of the current multi-cast communication.

The RTT calculation is accomplished by, first, determining the travel time and, then, reconciling the clock difference of the two nodes that are performing the RTS-TOA/CTS-TOA communication. Travel time $T_{TOF}$ between these two nodes is defined by the formula:

$$T_{TOF} + \frac{(T'_0 - T_0) - (T'_1 - T_1)}{2} \quad (2)$$

From the travel time, the clock difference $T_{diff}$ between the two nodes can be calculated using the formula:

$$T_{diff} = T'_0 - T'_1 - T_{TOF} \quad (3)$$

If the travel time $T_{TOF}$ and the clock difference $T_{diff}$ are known, then the range between the two nodes can be approximated sufficiently with the understanding that the communications travel at the speed of light. Thus, after finishing the RTT calculation, sending node $N_0$ will define a range entry for receiving node $N_r$ to be equal to the range calculated utilizing the formulas above.

Upon receiving the RTS-TOA originated from receiving node $N_r$, the random destination node $N_d$ will repeat the operations already performed by receiving node $N_r$ (Step 900). Such repetition is indicated in the lower half of FIG. 2 where new random destination nodes $N_d$ are indicated by the horizontal row of destination nodes $N_d$ extending towards the right of FIG. 2. It is noted, however, that the random destination node $N_d$ is selected such that it is neither sending node of the immediately preceding step nor the destination node that the CTS-TOA was addressed to in the immediately preceding step. In this step, the receiving node $N_r$ becomes the next sending node $N_0$ and the destination node $N_d$ becomes the next receiving node $N_r$.

Basically, Steps 400 to 900 can be repeated until all of the elements of a TOA-status list of a particular receiving node $N_r$ become 1—a condition indicating that all of the RTTs from this receiving node $N_r$ to every other node have been collected. Therefore, a range can now be calculated between receiving node $N_r$ and each other neighboring node (which, in this example of a completely connected network, includes all of the nodes in the network), and the range-status list of this receiving node $N_r$ will be filled with only ones. Nonetheless, if receiving node $N_r$ still receives an RTS-TOA after all of its TOA-status elements become 1, receiving node $N_r$ simply unicasts, in Step 1000, a CTS-TOA to sending node $N_0$ without sending an RTS-TOA at the same time to another randomly chosen node $N_d$ (because it has already sent an RTS-TOA to all of its neighbors, which, in the completely connected network example, are all of the nodes in the network; in a multi-hop network, however, neighbors refers to only those devices that are in direct communication range of a particular device (see section 2 below)). Therefore, if a sending node $N_0$ receives a unicast CTS-TOA instead of a multi-cast CTS-TOA/RTS-TOA, sending node $N_0$ will know that receiving node's TOA-status list is full and sending node $N_0$, itself, should be responsible for randomly choosing the next node $N_d$ to send the next RTS-TOA (Step 200), but only if sending node $N_0$'s TOA-status list is not yet full (query of Step 1100).

If sending node $N_0$ receiving the unicast CTS-TOA as described above also has a full TOA-status list (Step 1100), sending node $N_0$ should also terminate its own RTS-TOA sending process in Step 1200. However, at this point, it is possible that some other nodes in the network have not measured RTT for some of their respective links. To assure that all of the links in the network are measured before the algorithm of the present invention ends, this sending node $N_0$ broadcasts a message (Step 1200) stating its TOA-status list is full. Therefore, other nodes, without all of their respective links being visited, will have the opportunity to begin as a special node $N_0$ and compete to resume the network ranging procedure. The procedure outlined above and with respect to FIG. 1 will continue (Step 1400) until all of the ranging measurements are performed and all nodes broadcast messages (Step 1300) stating that their respective TOA-status list is full.

After all ranging is finally complete, a broadcast message is sent by the first special node $N_0$ (Step 1500), for example, to collect all of the RTTs obtained on each node. From this information, any unknown location/locations can, then, be resolved based on a global optimization algorithm. It is not necessary for the first special node $N_0$ (Step 1500) to collect all of the RTTs obtained on each node. Any node can perform this function. Also, a separate device connected to the network, but that is not a node, can perform the RTT collection. All that is necessary is for the network to communicate the status that all nodes have full TOA-status lists (meaning that each node has obtained ranging information from every other possible node).

The significant improvement comparing the approach according to the present invention to the traditional brute force approach is that, because of the multi-cast transmission, the number of rounds of RTS-TOA/CTS-TOA is reduced by 50%. See Step 600.

Figure 3:
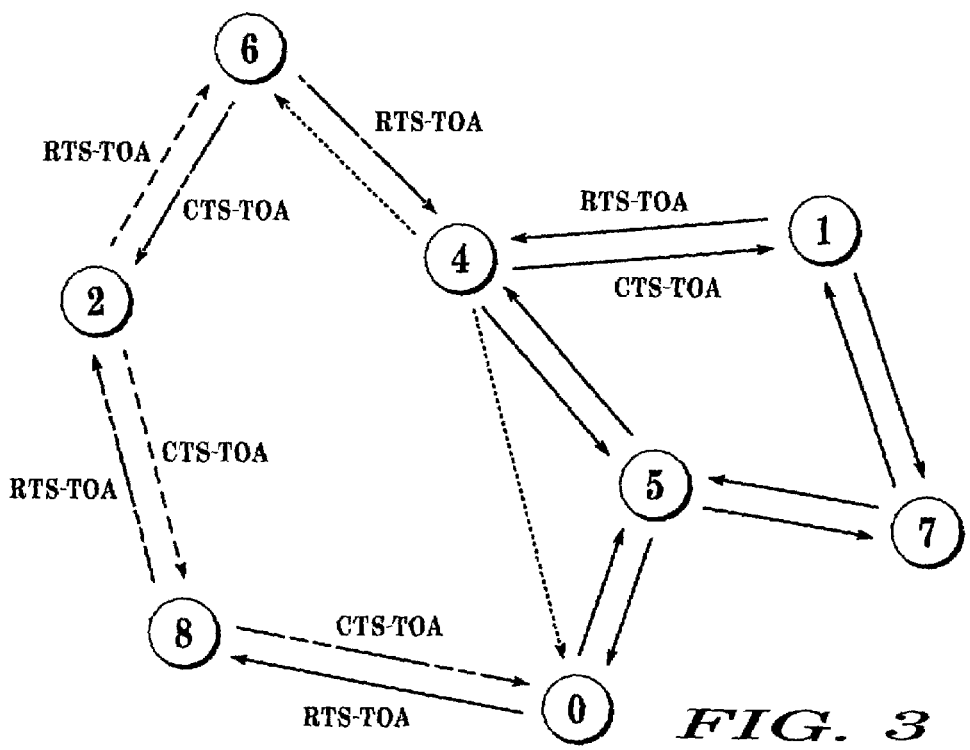
FIG. 3 is a signal flow diagram comparing the number of tasks completed in the prior art to the number of tasks completed in the method according to the invention.

The reduction is demonstrated in FIG. 3, which is a graphical illustration of how the number of rounds of communications is reduced in a path of nodes. Specifically, according to the prior art brute force approach, a one-way tour for obtaining ranging information through nodes 0, 1, 4, 5, and 7, will requires eight separate unicast communications. In contrast, according to the brute force approach of the present invention, obtaining ranging information through the tour of nodes 0, 8, 2, 6, and 4 (which has the same length of the first tour) only requires five communications (one unicast 0 to 8, multi-cast 8 to 0 and 2, multi-cast 2 to 8 and 6, multi-cast 6 to 2 and 4, multi-cast 4 to 6 and 0). When the tour becomes longer, the total number of rounds of communication in the multi-cast scenario approaches approximately one-half of the prior art unicast approach.

The algorithm of the present invention, therefore, provides an advantage, in that, it is based on a distributed control where each node manages its own TOA-status list, range-status list, and range list. Further, the termination criteria are localized.

B. Sequential Communication Approach

A sequential communication approach is different from the randomized communication approach. In the sequential communication approach, each node is also aware of the total number of nodes. But, in addition, each node knows:

in a first case, every other node's integer identification (ID) number, each of which is assigned sequentially; or in a second case where all nodes are ordered, a given order of every node in the network.

For example, in the first case, if all nodes have a sequentially assigned integer ID, a network with five nodes will have nodes 0, 1, 2, 3, and 4.

In the second case, if assigning a sequential integer ID is not possible (e.g., when IP address are used), the five nodes should be ordered. It is assumed, in this case, that these five nodes have names A, K, M, O, Q and that these nodes are ordered in this sequence. Then, to apply the algorithm that is set forth in the following text, each node needs to view the same sequence (A→K→M→O→Q) of these five nodes. As such, nodes A, K, M, O, and Q will have, implicitly, an index number of 0, 1, 2, 3, 4 by this order, respectively. These index numbers can be used in the same way as the sequential integer ID in the first case. To allow each node to have the same view of sequence, the very first node in the network that initiates the ranging process can broadcast the order to all other nodes before the algorithm starts.

Because the second case above can be translated into sequential integer IDs using index numbers, in the following descriptions, it is assumed that sequential integer IDs are used. Accordingly, a deterministic approach can be applied to the nodes. This deterministic algorithm is much simpler than a randomized communication and has, as its goal, not only the ability to terminate the procedure with all of the links between nodes being visited, but also to do so in the most efficient way possible.

The algorithm runs in a cyclic order through the nodes. To start, in Step 4000, a broadcast is made to ask each node to set m=1. The broadcast can come from an arbitrary one of the nodes or any other device connected to the network. For the case where sequential integer IDs are not used, a node order that will be used for ranging is also broadcasted. Because the total number of nodes X is known, the size of the node order is X.

Communication begins with a first node $N_0$ in Step 4100. The first node $N_0$ can be a predefined node or can be a randomly chosen node. Starting from the first node $N_0$, the procedure of continuous RTS-TOA/CTS-TOA can be executed by selecting the next node available on the local list for receiving the next RTS-TOA in a way that is similar to that which was described for the randomized communication scenario. Accordingly, such a process need not be explained further.

Alternatively, and preferably, to choose which other node the first node $N_0$ will send the first RTS-TOA unicast and which other further nodes will receive subsequent RTS-TOA/CTS-TOA multi-cast transmissions (see FIG. 2), the selection of the next node $N_d$ for receiving the new RTS-TOA can be made according to the following algorithm in Step 4200 where:

I=the current node ID ($N_0$);

m=an integer equal to the current round of RTT measurement for the current node with identification I;

J=the next destination node ID ($N_d$);

each node that next receives the new RTS-TOA will be executing the algorithm separately and independently;

every time a node gets visited again, its m value increases by 1; and

The following pseudo-program is executed:

Set m=1 (4)

$J=\mathrm{mod}(I+m,X)$ (5)

$m=m+1$ (6)

Jump back to (5) until m=X. (7)

Because J is an action to be taken by each node, the variable I changes to the ID of the currently transmitting node ($N_r$), which means that the variable I will change every time a new node is transmitting. Another way of describing this process is to assume that a "token" is being handed over to the next destination node ID ($N_d$) every time a communication occurs.

Figure 5:
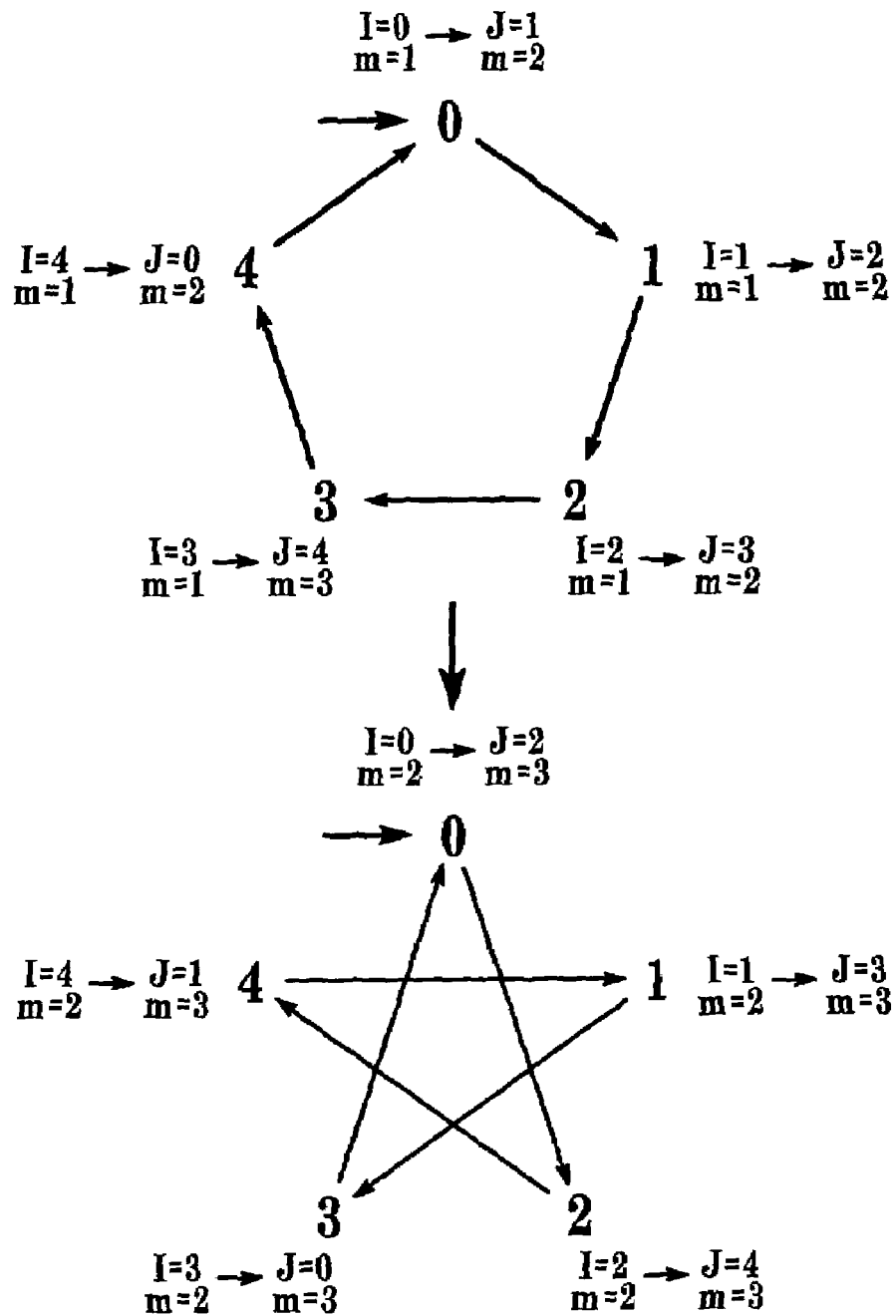
FIG. 5 is a control flow diagram indicating a second portion of the communication flow of FIG. 4.
Figure 6:
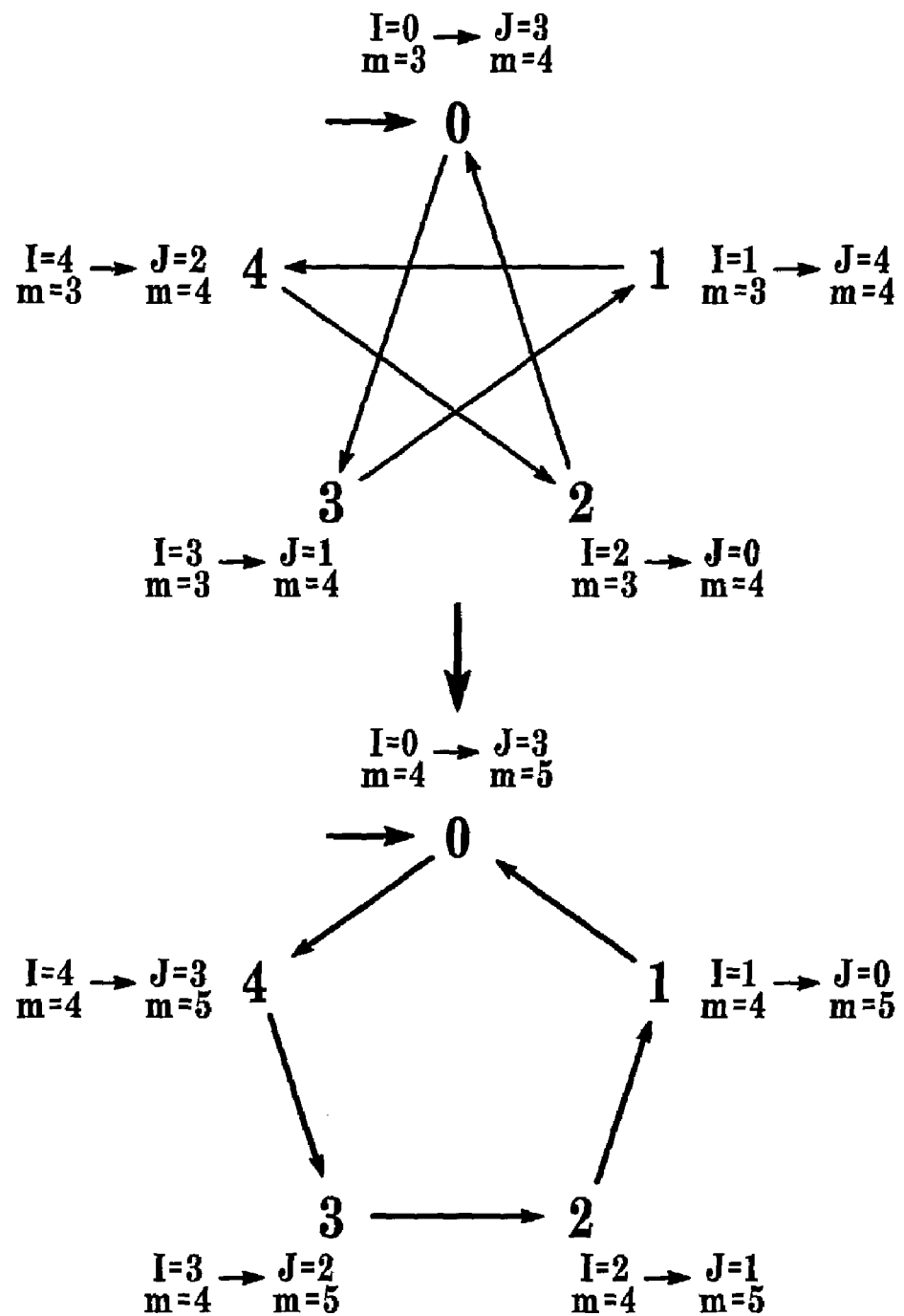
FIG. 6 is a control flow diagram indicating a first portion of communication flow according to the method of the present invention for an example with even number of nodes.

To give a simplified example of how selection of next nodes occur with the algorithm, an example of five nodes is selected with node IDs being 0, 1, 2, 3, and 4, respectively. This example is illustrated in FIGS. 5 and 6. If the current round node is 0, then the next node to transmit to from node 0 is mod(0+1,5), which results in a 0 result with a remainder of 1 when the integers 1 and 5 are divided and, therefore, the next node to transmit is the node with ID=1. Before handover of the token occurs, or simultaneously therewith or even before, the node with ID=0 increments its own value of m in Step 4300. Thus, when the node with ID=0 is to transmit again, m will be equal to 2. The node with ID=1 is the next to transmit (see Step 4400), therefore, I is now equal to 1. Thus, the result of equation (5) is the result of mod(1+1,5), which is 2. Thus, the next node to transmit has ID=2. Continuing this algorithm (Steps 4500, 4600, 4700), the next nodes to transmit will be 3 and 4, respectively. The node after 4, however, is the node with ID=0, a node that has already transmitted once before. Because it would not be efficient to transmit from node with ID=0 to the node with ID=1 again, it is desirable to not repeat such a transmission. The algorithm of the present invention insures that no such repetition occurs. Specifically, now that m for the node with ID=0 is equal to 2, the next node to receive a transmission will be the node with an ID equal to mod(0+2, 5), which is 2. This situation where m=2 is illustrated in the bottom half of FIG. 5. Because the node with ID=2 has already transmitted once (see Step 4400 and 4700), its m value is equal to 2 and, therefore, the next node to receive the transmission will be the node with an ID equal to mod(2+2, 5), which is 4. This process continues, as illustrated in FIG. 6, until all nodes of the network are covered (see Step 4500).

Figure 7:
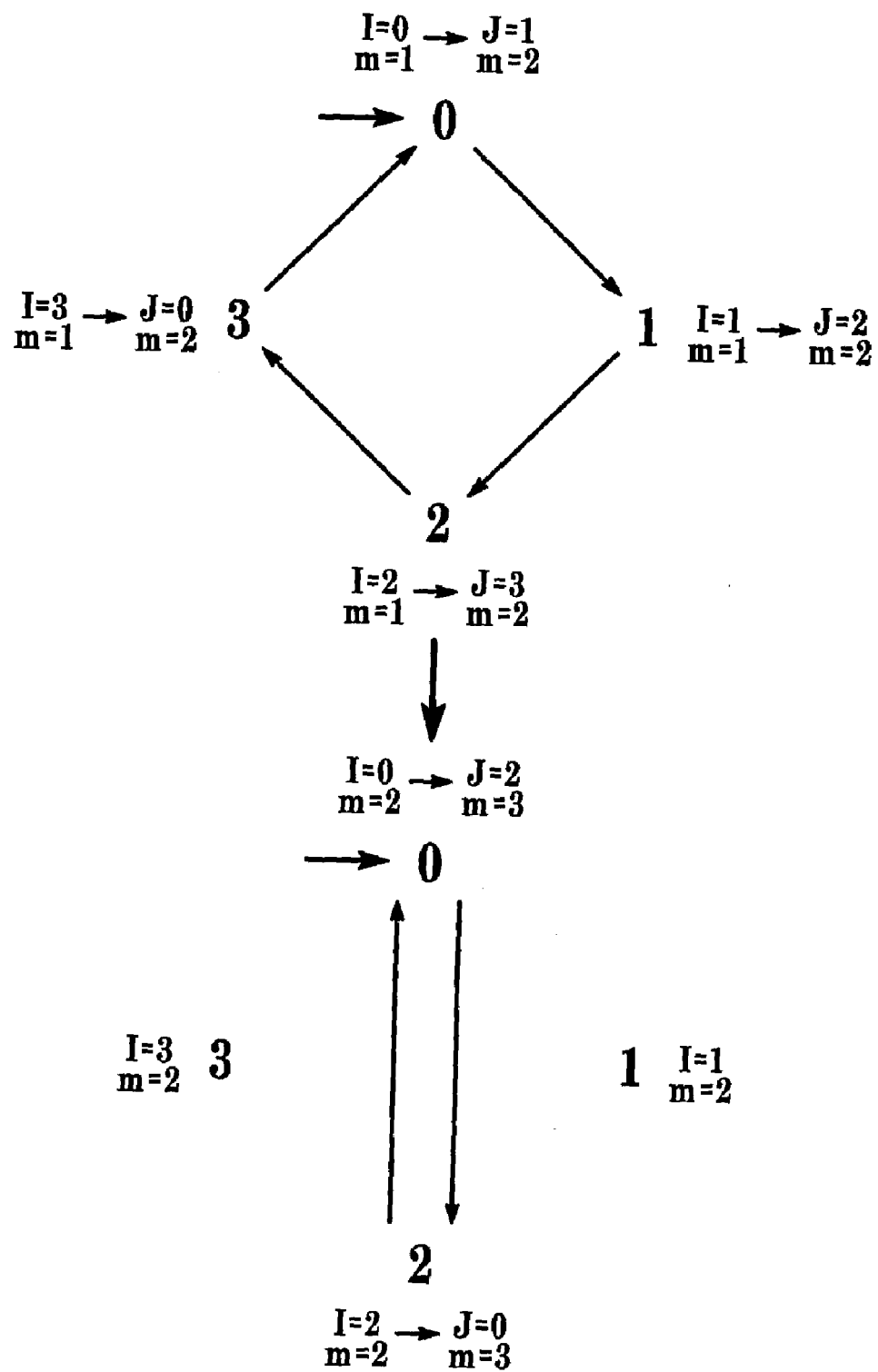
FIG. 7 is a control flow diagram indicating a second portion of the communication flow of FIG. 6.

FIGS. 7 and 8 similarly illustrate the process, but with a network having an even number of nodes. Specifically, if the current round node is 0, then the next node to transmit is the node with an ID=mod(0+1,5)=1. The node with ID=0 increments its own value of m to 2 (see Step 4300). The node with ID=1 is the next to transmit, therefore, I is now equal to 1. Thus, the result of equation (5) is the result of mod(1+1,5), which is 2. Thus, the next node to transmit has ID=2.

Continuing this algorithm, the next node to transmit will be 3. The node after 3, however, is the node with ID=0, a node that has already transmitted once before. Similarly avoiding repetition of such a transmission, now that m for the node with ID=0 is equal to 2, the next node to receive a transmission will be the node with an ID equal to mod(0+2, 5), which is 2. This situation where m=2 is illustrated in the bottom half of FIG. 7. The node with ID=0 increments its own value of m to 3(see Step 4300). Because the node with ID=2 has already transmitted once, its m value is equal to 2 and, therefore, the next node to receive the transmission will be the node with an ID equal to mod (2+2, 5), which is 0. The node with ID=0 processes mod(0+3, 4) to be 3. Thus, as shown in FIG. 8, the next node to transmit has ID=3. Continuing this algorithm, the next node to transmit will be the node with ID=1, and, then, successively, the nodes with IDs=3, 2, 1, and 0. Accordingly, all nodes of the network are covered.

The final result for networks with both odd and even numbers of nodes is that the ranging transmissions are reduced to approximately 50%.

Figure 4:
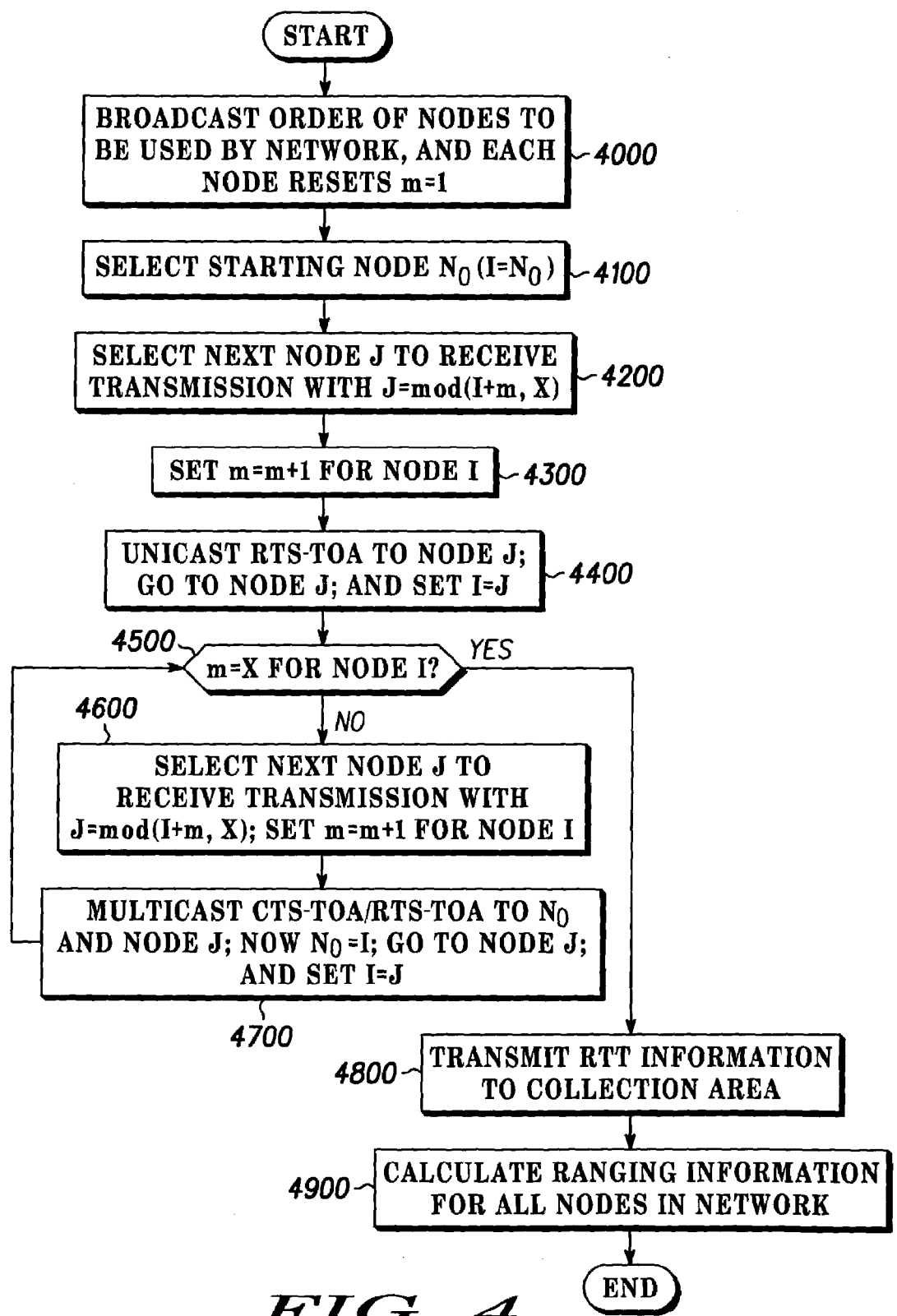
FIG. 4 is a control flow diagram indicating a first portion of communication flow according to the method of the present invention for an example with odd number of nodes.

This algorithm can be explained with the following steps that simulate a computer program, which steps are illustrated in FIG. 4:

Start

| | |
|---|---|
| Set X=total number of nodes in network | (8) |
| Set m=1 for each of the X nodes | (9) |
| Set I=first node ID to transmit | (10) |
| If m is less than X then continue, otherwise go to (17) | (11) |
| Set J=mod(I+m,X) | (12) |
| Handover from I to J | (13) |
| Set m=m+1 for node I | (14) |
| Set I=J | (15) |
| Jump to (11) for X*(X−1) times (define next transmitting node) | (16) |
| End | (17) |

Regardless of using randomized or sequential communications for the described range measurements method, the measurements can be terminated successfully with 100% of the links visited in a completely connected network. Computer simulations verified the accuracy of these algorithms.

2. Multi-Hop Peer-to-Peer Network

Two approaches of network-wide ranging are proposed: (1) direct application of the procedures with continuous multi-cast triggered with a unicast by a source node, as described in the previous section; and (2) modified procedures with continuous multi-casts triggered by multiple unicasts from the neighboring nodes of a source node after receiving broadcast by the node.

In contrast to the completely connected wireless network where every node is a neighbor of every other node, in a multi-hop network, only peer-to-peer communication is allowed. Being a multi-hop network means that some nodes can communicate with other nodes of the network, but, because only some nodes (not all) are in range of a particular node, the number of communication possibilities from one node to other nodes is limited. In such a sparse network, it is assumed that every node is connected with at least four other nodes. With such an assumption taken as true, an iterative location algorithm becomes applicable.

In this example of a multi-hop network, it is also assumed all of the nodes have an established local neighbor list. Therefore, the local TOA-status and range-status lists are limited to only including information corresponding to the neighbor list (this is in contrast with the entire network of nodes being represented in the list for the completely connected wireless network). Applying these two assumptions allows the basic algorithm that improves pair-wise ranging described above for a completely connected network to be entirely applicable to the multi-hop network. The only difference is that the criteria for terminating the procedure are no longer valid. Such terminating criteria become highly topologically dependent. Nonetheless, the multi-cast approach described above still reduces the number of rounds of communications.

In addition, the network degree is assumed to be not so high such that the delay in collision resolution is small enough, thus, the clock error can be ignored during the process that all of the neighbors acknowledge a broadcast CTS-TOA. Network degree refers to the number of devices that a node can communicate with directly without going through an intermediate device; in other words, it is an average number of neighbors of a node. Not having too many neighbors means that there will be fewer chances for collision and reduces the delay in receiving feedback. Thus, if one node broadcasts a CTS-TOA to all of its neighbors, there should acceptable timing accuracy. The time duration of collision resolution is relevant to the specific starting mechanism described in the context (beginning by broadcast). The procedure of collision resolution has to be so fast that clock jitter is not a factor, "clock jitter" being a random error that might accumulate with time.

In the multi-cast approach applied to a multi-hop network, instead of starting the transmission of a unicast format of RTS-TOA, the source node $N_0$ broadcasts a message to each neighboring node that can receive this transmission. Upon receiving the RTS-TOA, all of the neighboring nodes will start RTS-TOA/CTS-TOA in parallel. While such an approach is subject to the delay characteristics of collision resolution, it is, nonetheless, deterministic and correctable.

In each of the embodiments described above, nodes of communications network are mentioned. FIG. 9 is a block circuit diagram of a node 9000 that can carry out the processes according to the invention, regardless of the nature of the network (i.e., completely connected, multi-hop peer-to-peer). Each node 9000 has a processor 9100 for processing communications, a receiver 9200 for receiving communications, and a transmitter 9300 for transmitting communications. Of course, the receiver 9200 and transmitter 9300 can be combined into a non-illustrated transceiver unit 9200/9300. To hold the lists and other ranging information, the node can also have a memory 9400. The memory 9400 is not limited to holding ranging data and can be used for any needed storage operation of the processor 9100.

While the preferred embodiments of the invention have been illustrated and described, it will be clear that the invention is not so limited. Numerous modifications, changes, variations, substitutions, and equivalents will occur to those skilled in the art without departing from the spirit and scope of the present invention as defined by the appended claims.

We claim:

1. A method for reducing communications in a peer-to-peer wireless network having nodes, which comprises:
sending an RTS-TOA ranging communication from a first node in a group of the nodes to a second different node in the group;
receiving the RTS-TOA ranging communication with the second node and sending a multi-cast CTS-TOAIRTS-TOA ranging communication from the second node as a reply to the received RTS-TOA ranging communication;
successively and sequentially repeating the multi-cast sending step for each of the group of nodes
carrying out the sending step by sending a CTS-TOA message of the multi-cast ranging communication from the second node to the first node as a reply to the received RTS-TOA message of the multi-cast ranging communication;
sending the RTS-TOA ranging communication from the second node to a third node in the group different from the first node and the second node;
repeating the multi-cast sending step for all of the nodes in the group;
providing at least each node in the group with a memory to hold a Time-of-Arrival status list, a range-status list, and a range list;
providing the network with M reference nodes and N unknown nodes; and
providing the Time-of-Arrival-status list in each node with an individual entry for each of the other nodes in the group;
providing the range-status list in each node with an individual range-status entry for each of the other nodes in the group;
providing the range list in each node with an individual range entry for each of the other nodes in the group; and
setting a dimension of each of the Time-of-Arrival-status list, the range-status list, and the range list equal to M+N−1.

2. The method according to claim 1, which further comprises:
carrying out the sending, receiving, and successively and sequentially repeating steps by:
starting determination of range between nodes from a source node and resetting each entry of the Time-of-Arrival-status list, the range-status list, and the range list in each node of the group;
randomly selecting a receiving node other than the source node with the source node;
transmitting a unicast RTS-TOA message from the source node to the receiving node;
setting a Time-of-Arrival-status of the receiving node in the Time-of-Arrival-status list of the source node;
storing a first transmission time stamp with the source node;
receiving the unicast RTS-TOA message with the receiving node and recording a first arrival time stamp with the receiving node;
determining if any entry of the Time-of-Arrival-status list of the receiving node is not set and, if any entry is not set, then:
selecting a random destination node that is not the source node with the receiving node,
recording a second transmission time stamp with the receiving node, and sending the multi-cast ranging communication from the receiving node to the source node and to the destination node;
setting a Time-of-Arrival-status of the destination node in the Time-of-Arrival status list of the receiving node;
receiving the CTS-TOA message from receiving node with the source node,
recording a second arrival time stamp of the received CTS-TOA message with the source node, performing a round-trip-time calculation with the source node based upon the first transmission time stamp, the first arrival time stamp, the second transmission time stamp, and the second arrival time stamp;
after the source node finishes the round-trip-time calculation, setting a range status flag in the range-status list of the source node for the receiving node and recording the round-trip-time calculation in the range list of the source node:
upon receiving the RTS-TOA message from the receiving node with the destination node, repeating the CTS-TOA receiving, second arrival time stamp recording, round-trip-time calculating, flag setting, and calculation recording steps performed by the source node with the receiving node; and
repeating the RTS-TOA receiving, first arrival time stamp recording, list determining, random destination node selecting, second transmission time stamp recording, multi-cast sending, and status setting steps performed by the receiving node with the destination node.

3. The method according to claim 2, which further comprises carrying out the repeating steps with the receiving node and with the destination node until all of the nodes in the group have finished all round-trip-time calculations for all other nodes in the group.

4. The method according to claim 2, which further comprises carrying out the repeating steps with the receiving node and with the destination node until all of the nodes in the network have finished all round-trip-time calculations for all other nodes in the network.

5. The method according to claim 2, which further comprises carrying out the destination node selecting step by selecting the random destination node to be neither the source node of the immediately preceding step nor the destination node to which the CTS-TOA message was addressed in the immediately preceding step.

6. The method according to claim 2, which further comprises carrying out the repeating steps with the receiving node and with the destination node until all of the elements of a Time-of-Arrival-status list of a given receiving node are set.

7. The method according to claim 6, which further comprises calculating a range between each receiving node and each other node of the group.

8. The method according to claim 2, which further comprises carrying out the determining step by determining if any entry of the Time-of-Arrival status list of the receiving node is not set and, if all entries are set, then:
sending a unicast CTS-TOA communication to the source node from the receiving node;
receiving the unicast CTS-TOA communication with the source node, and:
if the Time-of-Arrival-status list of the source node is not full, then selecting another random destination node with the source node not being the immediately preceding destination node; and
if the Time-of-Arrival-status list of the source node is full, then terminating transmission with the source node and broadcasting a Time-of-Arrival-status list full message with the source node to at least one other node in the group.

9. The method according to claim 3, which further comprises, if all nodes of the group have full Time-of-Arrival-status lists, then collecting all round-trip time calculations and resolving unknown locations of at least one node in the group.

10. The method according to claim 3, which further comprises, if all nodes of the group do not have full Time-of-Arrival-status lists, then defining each non-filled node of the group not having a full Time-of-Arrival-status list to be the source node and repeating, in parallel, the selecting of the randomly selected receiving node other than the source node step with each non-filled node so defined as the source node.

11. The method according to claim 5, which further comprises:
repeating the non-filled node defining step until all ranging measurements are performed; and
collecting all round-trip-time calculations and resolving unknown locations of at least one node in the group.

12. The method according to claim 6, which further comprises defining the group as the entire network.

13. The method according to claim 12, which further comprises providing the network as a completely connected network.

14. The method according to claim 6, which further comprises providing the network as a multi-hop peer-to-peer network.

15. The method according to claim 1, which further comprises:
providing the nodes with identifications;
ordering the identifications in a single list; and
storing the ordered list in the memory of each of the nodes.

16. The method according to claim 10, which further comprises providing the nodes with unique, sequential integer identifications.

17. The method according to claim 10, which further comprises providing the nodes with unique Internet protocol address identifications.

18. The method according to claim 10, which further comprises broadcasting a reset command to each node of the group.

19. The method according to claim 13, which further comprises:
providing an integer flag in each node; and
carrying out the reset broadcasting step by broadcasting the reset command to set the integer flag of each node to be equal to I.

20. The method according to claim 14, which further comprises carrying out the sending, receiving, and successively and sequentially repeating steps by:
starting a determination of range between nodes from an initialization node and resetting each entry of the Time-of-Arrival-status list, the range-status list, and the range list in each node of the group;
selecting a node at the initialization node according to the formula: J=mod(I+m, X), where:
I is the identification of a current node to be initiating the next communication and the initialization node is the first current node;
J is the identification of the next node to receive the next communication;
m is the integer flag of the current round of round-trip-time measurement for the current node with identification I; and
X is the total number of nodes in the group;

transmitting a unicast RTS-TOA message from the initialization node to the next node, setting a Time-of-Arrival-status of the next node in the Time-of-Arrival-status list of the initialization node, storing a current transmission time stamp with the initialization node, and incrementing the integer flag m of the initialization node by 1;
defining the initialization node as a previous node, and defining the next node as the current node;
receiving the RTS-TOA message with the current node and performing the following steps with the current node:
recording a first arrival time stamp;
checking if the integer flag of the current node is equal to X, and:
if the integer flag of the current node is equal to X, then terminating the determination of range between the nodes of the group and calculating ranging data for all nodes in the group; and
if the integer flag of the current node is not equal to X, then:
selecting the next node to receive the next transmission according to the formula:
J=mod(I+m, X), incrementing the integer flag m of the current node by 1, recording a second transmission time stamp with the current node, and sending the multi-cast ranging communication from the current node to the previous node and to the next node;
setting a Time-of-Arrival-status of the next node in the Time-of-Arrival-status list of the current node;
receiving the CTS-TOA message of the multi-cast ranging communication with the previous node, recording a current local arrival time stamp of the received CTS-TOA message with the previous node, performing a round-trip-time calculation with the previous node based upon the current transmission time stamp, the current local arrival time stamp, the second transmission time stamp, and the first arrival time stamp, and, after the previous node finishes the round-trip-time calculation, setting a range status flag in the range-status list of the previous node for the current node and recording the round-trip-time calculation in the range list of the previous node; and
repeating with the next node the functionality of the current node upon receiving the RTS-TOA message, and repeating with the current node the functionality of the previous node upon receiving the CTS-TOA message.

21. The method according to claim 15, which further comprises carrying out the repeating steps by:
repeating the CTS-TOA receiving, current local arrival time stamp recording, roundtrip-time calculating, flag setting, and calculation recording steps performed by the previous node with the current node; and
repeating the RTS-TOA receiving, first arrival time stamp recording, integer flag checking, ranging terminating and calculating, next node selecting, integer flag incrementing, second transmission time stamp recording, multi-cast sending, and status setting steps performed by the current node with the next node.

22. The method according to claim 15, which further comprises carrying out the range termination step by:
recording a second transmission time stamp with the current node, and sending a unicast CTS-TOA message from the current node to the previous node;
receiving the CTS-TOA message with the previous node, recording a current local arrival time stamp of the received CTS-TOA message with the previous node, performing a round-trip-time calculation with the previous node based upon the current transmission time stamp, the current local arrival time stamp, the second transmission time stamp, and the first arrival time stamp; and after the previous node finishes the round-trip-time calculation:

setting a range status flag in the range-status list of the previous node for the current node;

recording the round-trip-time calculation in the range list of the previous node; and collecting all round-trip-time calculations of the group and calculating ranging data for all nodes in the group based upon the round-trip-time calculations.

23. The method according to claim 15, which further comprises:

calculating a range between each respective pair of nodes of the group; and resolving unknown locations of at least one node in the group based upon the calculated ranges.

24. The method according to claim 15, which further comprises:

collecting all round-trip-time calculations;

calculating a range between each respective pair of nodes of the group; and resolving unknown locations of at least one node in the group based upon the calculated ranges.

25. The method according to claim 18, which further comprises defining the group as the entire network.

26. The method according to claim 18, which further comprises providing the network as a completely connected network.

27. The method according to claim 18, which further comprises providing the network as a multi-hop peer-to-peer network.

28. The method according to claim 14, which further comprises carrying out the sending, receiving, and successively and sequentially repeating steps by:

A) starting a determination of range between nodes from an initialization node and resetting each entry of the Time-of-Arrival-status list, the range-status list, and the range list in each node of the group;

B) selecting a node at the initialization node according to the formula: J=mod(I+m, X), where:

I is the identification of the current node to be initiating the next communication and the initialization node is the first current node;

J is the identification of the next node to receive the next communication;

m is the integer flag of the current round of round-trip-time measurement for the current node with identification I; and X is the total number of nodes in the group;

C) transmitting a unicast RTS-TOA message from the initialization node to the next node, setting a Time-of-Arrival-status of the next node in the Time-of-Arrival-status list of the initialization node, storing a current transmission time stamp with the initialization node, and incrementing the integer flag m of the initialization node by 1;

D) defining the initialization node as a previous node, and defining the next node as the current node:

E) receiving the RTS-TOA message with the current node and performing the following steps with the current node:

E1) recording a first arrival time stamp;

E2) checking if the integer flag of the current node is equal to X, and:

E2a) if the integer flag of the current node is equal to X, then terminating the determination of range between the nodes of the group and calculating ranging data for all nodes in the group; and E2b) if the integer flag of the current node is not equal to X, then:

E2b1) selecting the next node to receive the next transmission according to the formula: J=mod(I+m, X), incrementing the integer flag m of the current node by 1, recording a second transmission time stamp with the current node, and sending the multi-cast ranging communication from the current node to the previous node and to the next node;

E2b2) setting a Time-of-Arrival-status of the next node in the Time-of-Arrival-status list of the current node;

E2b3) receiving the CTS-TOA message of the multi-cast ranging communication with the previous node, recording a current local arrival time stamp of the received CTS-TOA message with the previous node, performing a round-trip-time calculation with the previous node based upon the current transmission time stamp, the current local arrival time stamp, the second transmission time stamp, and the first arrival time stamp, and, after the previous node finishes the round-trip-time calculation, setting a range status flag in the range-status list of the previous node for the current node and recording the roundtrip-time calculation in the range list of the previous node; and E2b4) repeating with the next node the functionality of the current node in steps E), E1), E2), E2a), E2b), E2b1), and E2b2) upon receiving the RTS-TOA message, and repeating with the current node the functionality of the previous node in step E2b1) and E2b3) upon receiving the CTS-TOA message.

29. A method for reducing communications in a peer-to-peer wireless network having nodes, which comprises:

sending an RTS-TOA ranging communication from an initialization node in a group of the nodes to another different node in the group;

receiving the RTS-TOA ranging communication with the other node and sending a multi-cast CTS-TOA/RTS-TOA ranging communication from the other node as a reply to the received RTS-TOA ranging communication; and successively and sequentially repeating the multi-cast sending step for each of the group of nodes by separately and independently executing a selection algorithm with each node next receiving the RTS-TOA message of the multi-cast ranging communication, the algorithm selecting a new receiving node other than the initialization node with the other node according to the formula: J=mod(I+m, X), where:

I is the identification of the current node to be initiating the next communication and the initialization node is the first current node;

J is an identification of the new receiving node to next receive a communication;

m is an integer flag of the current round of round-trip-time measurement for the current node with identification I;

X is the total number of nodes in the group; and m is incremented by a respective node each time the multi-cast ranging communication is sent.

30. The method according to claim 24, which further comprises, if the integer flag of the current node is equal to X, then terminating the determination of range between the nodes of the group and calculating ranging data for all nodes in the group.

31. In a network of communications nodes, a communications node, comprising:

a receiver for receiving RTS-TOA and CTS-TOA ranging communications from other communications nodes in a group;

a transmitter for sending RTS-TOA and CTS-TOA ranging communications and multi-cast RTS-TOA/CTS-TOA ranging communications to other communications nodes in the group;

a memory storing a unique identification, an integer flag, and a total number of nodes in the group; and a processor connected to said receiver, to said transmitter, and to said memory, said processor being programmed to:

transmit a multi-cast CTS-TOA/RTS-TOA ranging communication as a reply to a received RTS-TOA ranging communication from a first node;

select a new receiving node other than the first node to receive the RTS-TOA ranging communication according to the formula: J=mod(I+m, X), where:

J is an identification of the new receiving node to next receive a communication;

I is the unique identification stored in said memory;

m is said integer flag of a current round of round-trip-time measurement for the node with identification I; and X is the total number of nodes in the group; and increment m each time said multi-cast ranging communication is sent.

32. The node according to claim 31, wherein said processor is programmed to transmit the CTS-TOA ranging communication to the first node as a reply to the received RTS-TOA ranging communication and to transmit the RTS-TOA ranging communication to the new receiving node.

33. The node according to claim 32, wherein said memory holds a Time-of-Arrival-status list, a range-status list, and a range list.

34. In a network of communications nodes, a communications node, comprising:

a receiver for receiving a reset communication, an RTS-TOA ranging communication from a node in a group of nodes, and a CTS-TOA ranging communication from a node in the group;

a transmitter for sending RTS-TOA and CTS-TOA ranging communications and multi-cast CTS-TOA/CTS-TOA ranging communications to other communications nodes in the group;

a memory storing a unique identification, an integer flag, a total number of nodes in the group, a Time-of-Arrival-status list, a range-status list, a range list, a dimension of each of said Time-of-Arrival-status list, said range-status list, and said range list being equal to a number of nodes in the group minus 1;

a processor connected to said receiver, to said transmitter, and to said memory, said processor being programmed to:

reset each entry of said Time-of-Arrival-status list, said range-status list, and said range list upon receipt of the reset communication;

receive an RTS-TOA ranging communication containing a first transmission time stamp and record a first arrival time stamp and set a Time-of-Arrival status in the Time-of-Arrival-status list for a first node during receipt of the RTS-TOA ranging communication;

determine if any entry of the Time-of-Arrival-status list in said memory is not set and, if any entry is not set, then:

randomly select a destination node to receive a new RTS-TOA ranging communication, the destination node not being the first node or any other node to which a new RTS-TOA ranging communication has already been sent;

record a second transmission time stamp and transmit a multi-cast CTS-TOA/CTS-TOA ranging communication as;

a CTS-TOA reply to the received RTS-TOA ranging communication from the first node at least containing the second transmission time stamp and the first arrival time stamp; and a new RTS-TOA ranging communication to the destination node containing the second transmission time stamp as a third transmission time stamp;

receive a CTS-TOA ranging communication from the destination node including a second arrival time stamp and a fourth transmission time stamp and record a third arrival time stamp of the received CTS-TOA ranging communication and set a Time-of-Arrival-status in the Time-of-Arrival-status list for the destination node;

perform a round-trip-time calculation based upon the third transmission time stamp, the second arrival time stamp, the fourth transmission time stamp, and the third arrival time stamp; and set a range status flag, after finishing the round-trip-time calculation, in said range-status list for the destination node and record the round-trip time calculation in said range list.

35. The node according to claim 34, wherein said processor is programmed to send a unicast CTS-TOA ranging communication to the first node if all entries of said Time-of-Arrival-status list are set.

36. The node according to claim 35, wherein said processor is programmed to select another random destination node that is not the immediately preceding destination node after receiving a unicast CTS-TOA ranging communication from the destination node if said Time-of-Arrival-status list in said memory is not full.

37. The node according to claim 36, wherein said processor is programmed to terminate transmission and broadcast a Time-of-Arrival-status list full message to at least one other node in the group if said Time-of-Arrival-status list is full.

38. The node according to claim 37, wherein said processor is programmed to transmit all round-trip-time calculations to at least one other node in the group to assist resolving unknown locations of at least one node in the group.

39. In a network of communications nodes, a communications node, comprising:

a receiver for receiving a reset communication, an RTS-TOA ranging communication from a node in a group of the nodes, and a CTS-TOA ranging communication from a node in the group;

a transmitter for sending RTS-TOA and CTS-TOA ranging communications and multi-cast RTS-TONCTS-TOA ranging communications to other communications nodes in the group;

a memory storing an ordered list of unique identifications for at least a group of the nodes, an integer flag, a total number of nodes in the group, a Time-of-Arrival-status list, a range-status list, a range list, a dimension of each of said Time-of-Arrival status list, said range-status list, and said range list being equal to a number of nodes in the group minus 1;

a processor connected to said receiver, to said transmitter, and to said memory, said processor being programmed to:

reset each entry of said Time-of-Arrival-status list, said range-status list, and said range list upon receipt of the reset communication;

reset said integer flag to 1;

receive an RTS-TOA ranging communication containing a first transmission time stamp and record a first arrival time stamp and set a Time-of-Arrival status in said Time-of-Arrival-status list for a first node during receipt of the RTS-TOA ranging communication;

select a destination node to receive a new RTS-TOA ranging communication according to the formula: J=mod(I+m, X), where:

J is an identification of the destination node to next receive a communication;

I is the unique identification stored in said memory;

m is said integer flag of a current round of round-trip-time measurement for the node with identification I; and X is the total number of nodes in the group;

record a second transmission time stamp, increment said integer flag by 1, and transmit a multi-cast CTS-TOAIRTS-TOA ranging communication as:

a CTS-TOA reply to the received RTS-TOA ranging communication from the first node at least containing the second transmission time stamp and the first arrival time stamp; and a new RTS-TOA ranging communication to the destination node containing the second transmission time stamp as a third transmission time stamp;

receive a CTS-TOA ranging communication from the destination node including a second arrival time stamp and a fourth transmission time stamp and record a third arrival time stamp of the received CTS-TOA ranging communication and set a Time-of-Arrival-status in said Time-of-Arrival-status list for the destination node;

perform a round-trip-time calculation based upon the third transmission time stamp, the second arrival time stamp, the fourth transmission time stamp, and the third arrival time stamp; and set a range status flag, after finishing the round-trip-time calculation, in said range-status list for the destination node and record the round-trip-time calculation in said range list.

40. The method according to claim 39, wherein said processor is programmed to transmit all round-trip-time calculations to at least one other node in the group to assist resolving unknown locations of at least one node in the group.

* * * * *

UNITED STATES PATENT AND TRADEMARK OFFICE
CERTIFICATE OF CORRECTION

PATENT NO.       : 7,269,138 B2
APPLICATION NO.  : 10/454192
DATED            : September 11, 2007
INVENTOR(S)      : Jian Huang et al.

Page 1 of 1

It is certified that error appears in the above-identified patent and that said Letters Patent is hereby corrected as shown below:

Col. 1, line 7, after the title and before the heading "FIELD OF THE INVENTION" the following paragraph should be inserted:

STATEMENT REGARDING FEDERALLY
SPONSORED RESEARCH OR DEVELOPMENT

This invention was made with United States Government support under 70NANB2H3001 awarded by the National Institute of Standards and Technology (NIST). The United States Government has certain rights in the invention.

Signed and Sealed this

Twenty-seventh Day of January, 2009

JOHN DOLL
*Acting Director of the United States Patent and Trademark Office*